United States Patent
Fromentoux et al.

(10) Patent No.: US 12,267,727 B2
(45) Date of Patent: Apr. 1, 2025

(54) METHOD FOR MANAGING RESOURCES OF A CONVERGED FIXED ACCESS AND MOBILE RADIO TELECOMMUNICATIONS NETWORK, AND CORRESPONDING COMPUTER PROGRAM PRODUCT AND DEVICES

(71) Applicant: Orange, Issy-les-Moulineaux (FR)

(72) Inventors: Gaël Fromentoux, Chatillon (FR); Veronica Karina Quintuna Rodriguez, Chatillon (FR); Benoît Radier, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 414 days.

(21) Appl. No.: 17/611,125

(22) PCT Filed: May 4, 2020

(86) PCT No.: PCT/EP2020/062344
§ 371 (c)(1),
(2) Date: Nov. 12, 2021

(87) PCT Pub. No.: WO2020/229216
PCT Pub. Date: Nov. 19, 2020

(65) Prior Publication Data
US 2022/0225169 A1    Jul. 14, 2022

(30) Foreign Application Priority Data
May 15, 2019    (FR) ........................................ 1905044

(51) Int. Cl.
*H04W 16/10*    (2009.01)
*H04L 5/00*    (2006.01)
(Continued)

(52) U.S. Cl.
CPC ........... *H04W 28/16* (2013.01); *H04L 5/0032* (2013.01)

(58) Field of Classification Search
CPC ............................ H04W 28/16; H04L 5/0032
See application file for complete search history.

(56) References Cited

U.S. PATENT DOCUMENTS 5,208,914 A    5/1993    Wilson et al.
6,151,309 A *  11/2000  Busuioc ................. H04W 4/24
                                                          455/452.2
(Continued)

OTHER PUBLICATIONS

International Search Report for International Application No. PCT/EP2020/062344 mailed on Jun. 19, 2020.

*Primary Examiner* — Moustapha Diaby
(74) *Attorney, Agent, or Firm* — Knobbe, Martens, Olson & Bear, LLP (57) ABSTRACT

A method for managing resources of a converged fixed access and mobile radio telecommunications network is disclosed. Each operator of a plurality of mobile operators has at least one base station connected to a mobile radio part of the network. According to such a method, a centralized resource allocation management module carries out: receiving at least one request for resources, called mobile client request, emitted either by a mobile radio resource management module of each of the mobile operators, or by a first centralized resource request management module from at least one mobile radio service request previously received from the mobile radio resource management module of each of the mobile operators; and sending at least one resource allocation offer to the mobile radio resource management modules according to the at least one mobile client request and at least one predetermined resource allocation offer rule.

12 Claims, 4 Drawing Sheets

(51) Int. Cl.
*H04W 24/00* (2009.01)
*H04W 28/04* (2009.01)
*H04W 28/16* (2009.01)
*H04W 72/04* (2023.01)

(56) References Cited

U.S. PATENT DOCUMENTS

| | | |
|---|---|---|
| 6,510,434 B1 | 1/2003 | Anderson et al. |
| 6,718,390 B1 | 4/2004 | Still et al. |
| 6,909,691 B1 | 6/2005 | Goyal et al. |
| 7,548,985 B2 | 6/2009 | Guigui |
| 7,617,289 B2 | 11/2009 | Srinivasan et al. |
| 7,870,475 B2 | 1/2011 | Schachter |
| 7,958,087 B2 | 6/2011 | Blumenau |
| 9,021,118 B2 | 4/2015 | John et al. |
| 9,112,777 B1 | 8/2015 | Barclay et al. |
| 9,223,843 B1 | 12/2015 | Madhavarapu et al. |
| 10,116,732 B1 * | 10/2018 | Canton ............... H04L 41/0806 |
| 2008/0071922 A1 | 3/2008 | Chetuparambil et al. |
| 2008/0242295 A1 * | 10/2008 | Rui .................. H04M 3/42263 455/432.1 |
| 2012/0064908 A1 * | 3/2012 | Fox .................... H04L 12/1485 455/452.2 |
| 2012/0210066 A1 | 8/2012 | Joshi et al. |
| 2014/0207861 A1 | 7/2014 | Brandwine et al. |
| 2015/0379429 A1 | 12/2015 | Lee et al. |
| 2016/0014665 A1 * | 1/2016 | Centonza ........... H04W 36/304 455/436 |
| 2018/0184289 A1 * | 6/2018 | Dudley .................. H04W 8/26 |
| 2019/0068690 A1 * | 2/2019 | Canton ............... H04L 41/0895 |
| 2019/0132211 A1 * | 5/2019 | Yeung .................... H04L 67/10 |

* cited by examiner

METHOD FOR MANAGING RESOURCES OF A CONVERGED FIXED ACCESS AND MOBILE RADIO TELECOMMUNICATIONS NETWORK, AND CORRESPONDING COMPUTER PROGRAM PRODUCT AND DEVICES

CROSS-REFERENCE TO RELATED APPLICATIONS

This application is filed under 35 U.S.C. § 371 as the U.S. National Phase of Application No. PCT/EP2020/062344 entitled "METHOD FOR MANAGING RESOURCES OF A CONVERGED FIXED ACCESS AND MOBILE RADIO TELECOMMUNICATIONS NETWORK, AND CORRESPONDING COMPUTER PROGRAM PRODUCT AND DEVICES" and filed May 4, 2020, and which claims priority to FR 1905044 filed May 15, 2019, each of which is incorporated by reference in its entirety.

BACKGROUND

Field

The field of the development is that of the implementation of converged fixed access and mobile radio telecommunications networks. The development relates more particularly to the management of the resources (e.g., resources implemented in the local loop, radio resources, resources for the implementation of virtualised functions, called virtualised resources, etc.) in such telecommunications networks.

The development has numerous uses, in particular, but not exclusively, in the field of the telecommunications networks compliant with the latest-generation or future-generation 3GPP (for 3rd Generation Partnership Project) standards.

Description of the Related Technology

Future-generation mobile radio networks aim to centralise and virtualise the processing carried out in the baseband in central units, or CUs, moved upstream in the network. The radio signals processed are then transmitted to the distributed radio elements, or DUs (Distributed Units), for example the base stations, via resources implemented in the local loop (or front part) of the network. For example, the resources of the local loop are implemented in the form of optical links, microwave radio systems, or even pairs of conductors made of copper (e.g. in certain configurations in which the DUs are connected to a domestic gateway, also called modem or box, in a private home). In this context, a certain capacity of the resources used between the CUs and the DUs must be guaranteed by the network.

Moreover, various mobile operators can have all or a part of their DUs connected to the same single converged fixed access and mobile radio telecommunications network, the resources of which are shared among them. In this context, the mobile operators in question enter into competition in order to obtain resources of the telecommunications network to which their DUs are connected. This is in particular the case when a new need for resources appears after a reconfiguration of the mobile radio part of one of the operators (e.g. a change in number of carrier frequencies allocated to a DU). New resources of the converged fixed access and mobile radio network must thus be allocated to the mobile operator in question in order to support the new associated data bitrates. The issue arises in this case of the impact of this new allocation on the resources previously allocated to the other mobile operator.

Such mobile operators are also in competition with the fixed clients (e.g. a piece of user equipment connected to the fixed access part of the network via a modem connected to the local loop). For example, when such a fixed client implements new services requiring virtual resources moved upstream in the network (e.g. for uses of the type virtual reality, augmented reality, services with added value for small businesses, collection and processing of the data from sensors (Internet of Things, video surveillance camera, etc.), multimedia storage service, etc.).

Thus, the allocation of new resources to a given client (e.g. a client of a given mobile operator) during the expression of a new need for resources must not be carried out while giving the other clients (e.g. to the clients of the other mobile operators) the impression that they are wronged, in particular in a context of limited total resources.

There is therefore a need for an improved technique for managing the resources (e.g. virtualised resources, resources of the local loop, etc.) in a converged fixed access and mobile radio telecommunications network when various mobile operators enter into competition in order to obtain resources of the telecommunications network in question.

There is also a need for the technique in question to manage the competition between the various mobile operators and the fixed clients of the converged fixed access and mobile radio telecommunications network.

SUMMARY OF CERTAIN INVENTIVE ASPECTS

In one embodiment of the development, a method is proposed for managing resources of a converged fixed access and mobile radio telecommunications network. A part of the resources, called virtualised resources, is implemented in a virtualised form and moved in the network. Another part of the resources, called local loop resources, is implemented in a local loop of the network, a plurality of mobile operators each having at least one base station connected to a mobile radio part of the network via a "mobile radio" modem connected to the local loop. According to such a method, a centralised resource allocation management module carries out the following steps: receiving at least one request for resources, called mobile client request, emitted either by a mobile radio resource management module of each of the mobile operators, or by a first centralised resource request management module from at least one request for mobile radio service previously received from the mobile radio resource management module of each of the mobile operators; sending at least one resource allocation offer to the modules for management of the mobile radio resources according to said at least one mobile client request and at least one predetermined resource allocation offer rule.

Thus, the development proposes a novel and inventive solution for managing the resources of the converged fixed access and mobile radio telecommunications network in the context in which several mobile operators seek to obtain resources from the network in question.

More particularly, according to the proposed method, the module (software or hardware) for centralised management of the allocation of the resources of the network emits allocation offers to the various mobile operators while taking into account their various requests (requests for virtualised resources and requests for resources located in the local loop that can be implemented for example in the form of optical links, microwave radio systems, pairs of conductors made of copper, etc.) and on the basis of predetermined allocation offer rules. Since such predetermined rules used by the network resource allocation centralised management module are, or can be, known by the operators, the latter can have confidence in the resource allocation offers that are made to them.

In embodiments, the functionality carried out by the network resource allocation centralised management module is implemented via several modules for centralised management of the allocation, for example via a module for centralised management dedicated to the allocation of the virtualised resources of the network, and another module for centralised management dedicated to the allocation of the resources of the local loop of the network.

According to one embodiment, at least one piece of user equipment of a fixed operator is connected to a fixed access part of the network via at least one "fixed access" modem connected to the local loop. The centralised resource allocation management module carries out a reception of at least one request for resources emitted either by said at least one piece of user equipment of the fixed operator, or by a second centralised resource request management module from at least one request for fixed service previously received from said at least one piece of user equipment, called fixed client request. Said at least one allocation offer is also sent to said at least one piece of user equipment, said at least one allocation offer being dependent on said at least one fixed client request.

Thus, the resource allocation offers also take into account the requests for resources (for virtualised resources and for resources of the local loop) from the clients connected to the fixed access part of the network.

According to one embodiment, the centralised resource allocation management module carries out a reception: of at least one piece of information representing the availability of the local loop resources transmitted by a local loop and fixed access resource management module of the network; and/or of at least one piece of information representing the availability of the virtualised resources transmitted by a module for management of the virtualised resources moved in the network, said at least one allocation offer being dependent on said at least one piece of information representing the availability of the local loop resources and/or on said at least one piece of information representing the availability of the virtualised resources.

Thus, the resource allocation offers also take into account the requests for resources (for virtualised resources and for resources of the local loop) from the clients connected to the fixed access part of the network.

According to one embodiment, the centralised resource allocation management module carries out a transmission of said at least one piece of information representing the availability of the local loop resources and/or of said at least one piece of information representing the availability of the virtualised resources to the first and/or second centralised resource request management module.

Thus, the first and/or second centralised resource request management module is capable of forming a shared and updated database containing the information on the offers of resources of the local loop and of virtualised resources. Moreover, the first and/or second centralised resource request management module can transmit the information contained in the database in question to the fixed or mobile clients if needed. Alternatively, the database can be distributed on each fixed or mobile client and the information recorded can also be certified by consensus by each client as a certified distributed register.

According to one embodiment, the centralised resource allocation management module carries out a reception of at least one confirmation of acceptance of the resource allocation offer, called confirmed allocation offer, sent by: at least one module out of the modules for management of the mobile radio resources of each of the mobile operators; and/or said at least one piece of user equipment.

According to one embodiment, the centralised resource allocation management module sends at least one confirmation of reservation of the resources to the local loop and fixed access resource management module of the network and/or to the module for management of the virtualised resources moved in the network, said at least one confirmation of reservation of the resources being sent when said at least one confirmation of acceptance of the resource allocation offer is received.

Thus, the resources are effectively allocated to the client that sent the confirmation of reservation.

According to one embodiment, said at least one predetermined resource allocation offer rule belongs to the group comprising: a resource allocation offer is sent first in response to a request received first in a series of several requests; —a resource allocation offer is sent first in response to a request received last in a series of several requests; —a resource allocation offer is sent first in response to a request having a priority level of urgency of processing in a series of several received requests having various levels of urgency of processing; a resource allocation offer is made according to an auction mechanism; a resource allocation offer is made for a defined duration; and a resource allocation offer is only made if other resources are freed in exchange.

For example, when the resource allocation offer is made according to an auction mechanism, the mechanism in question is for example a simple auction mechanism (the highest price wins), a double auction mechanism (average of the bids), or an auction mechanism with or without a reserve price (the offer must be greater than the reserve price).

In one embodiment of the development, it is proposed that the first centralised resource request management module for mobile clients carry out the following steps: receiving at least one request for mobile radio service emitted by a mobile radio resource management module of each of the mobile operators; and transmitting to the network resource allocation centralised management module at least one request for resources taking into account said at least one request for mobile radio service.

Thus, the final mobile client only expresses their need in terms of service. The first module translates the needs associated with the service in question into terms of needs for resources that can be of different natures, e.g. virtual and/or for resources in the local loop. Thus, it is the first module that requests and ensures that all of the resources, potentially of different natures, that the final client needs are available from the module(s) for centralised management of the allocation of the resources of the network.

In one embodiment of the development, at least one piece of user equipment of a fixed operator is connected to a fixed access part of the network via at least one "fixed access" modem connected to the local loop. It is thus proposed that a second centralised resource request management module for fixed clients carry out the following steps: receiving at least one request for fixed service emitted by said at least one piece of user equipment of the fixed operator; and transmitting to the network resource allocation centralised management module at least one request for resources taking into account said at least one request for fixed service.

Thus, the final fixed client only expresses their need in terms of service. The second module translates the needs associated with the service in question into terms of needs for resources that can be of different natures, e.g. virtual and/or for resources in the local loop. Thus, it is the second module that requests and ensures that all of the resources, potentially of different natures, that the final client needs are available from the network resource allocation centralised management module(s).

The development also relates to a computer program comprising program code instructions for the implementation of the method as described above, according to any one of its various embodiments, when it is executed on a computer.

In one embodiment of the development, a device for centralised management of the allocation of resources of a converged fixed access and mobile radio telecommunications network is proposed. Such a management device comprises a reprogrammable calculation machine or a dedicated calculation machine configured to implement the steps of the management method according to the development as carried out by the module for centralised management of the allocation of resources of a converged fixed access and mobile radio telecommunications network (according to any one of the various aforementioned embodiments).

Thus, the features and advantages of this device are the same as those of the corresponding steps of the management method described above. Consequently, they are not described in more detail.

In one embodiment of the development, a device for centralised management of the requests for resources of a converged fixed access and mobile radio telecommunications network for mobile clients is proposed. Such a management device comprises a reprogrammable calculation machine or a dedicated calculation machine configured to implement the steps of the management method according to the development as carried out by the first centralised resource request management module for mobile clients (according to any one of the various aforementioned embodiments).

Thus, the features and advantages of this device are the same as those of the corresponding steps of the management method described above. Consequently, they are not described in more detail.

In one embodiment of the development, a device for centralised management of the requests for resources of a converged fixed access and mobile radio telecommunications network for fixed clients is proposed. Such a management device comprises a reprogrammable calculation machine or a dedicated calculation machine configured to implement the steps of the management method according to the development as carried out by the second centralised resource request management module for fixed clients (according to any one of the various aforementioned embodiments).

Thus, the features and advantages of this device are the same as those of the corresponding steps of the management method described above. Consequently, they are not described in more detail.

In one embodiment of the development, a node of a converged fixed access and mobile radio telecommunications network is proposed. Such a network node comprises at least one device out of the aforementioned devices (according to any one of the various aforementioned embodiments), i.e. a device for centralised management of the allocation of resources of a converged fixed access and mobile radio telecommunications network, a device for centralised management of the requests for resources of a converged fixed access and mobile radio telecommunications network for mobile clients and a device for centralised management of the requests for resources of a converged fixed access and mobile radio telecommunications network for fixed clients.

BRIEF DESCRIPTION OF THE DRAWINGS

Other objectives, features and advantages of the development will appear more clearly upon reading the following description, given as a simple illustrative example, and non-limiting, in relation to the drawings, among which.

DETAILED DESCRIPTION OF CERTAIN ILLUSTRATIVE EMBODIMENTS

The general principle of the development is based on the use of a module (software or hardware) for centralised management of the allocation of the resources of a converged fixed access and mobile radio telecommunications network in order to address in a centralised manner the various requests for resources emitted by the mobile clients of various mobile operators having at least a part of their DUs connected to the network in question. More particularly, the centralised resource allocation management module emits allocation offers to the various mobile operators while taking into account the various requests for resources emitted by the mobile operators in question as well as predetermined allocation offer rules. Since such predetermined rules are, or can be, known by the operators, the latter can have confidence in the resource allocation offers that are made to them.

Figure 1:
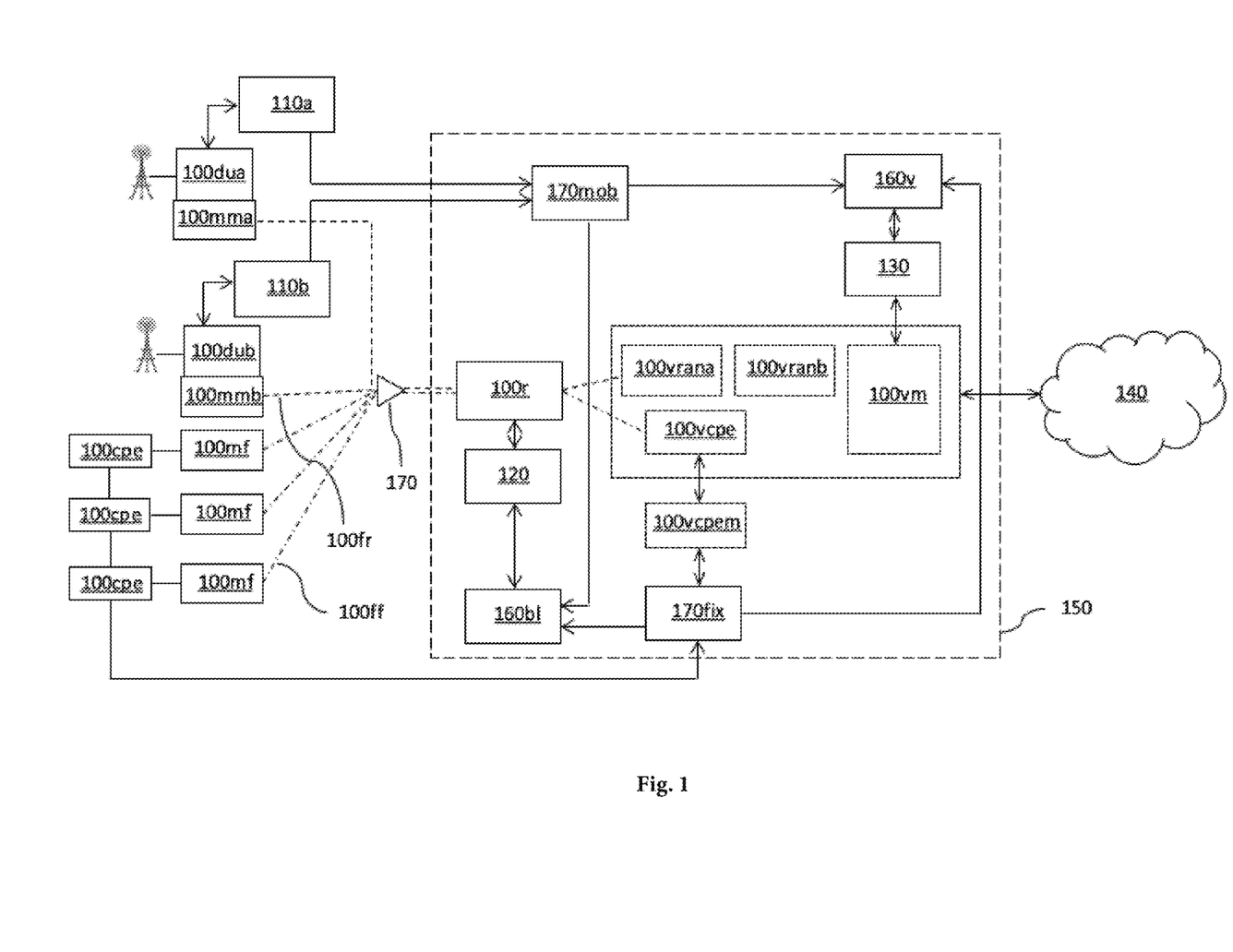
FIG. 1 shows the architecture of a converged fixed access and mobile radio telecommunications network, the resources of which are managed by a management method according to an embodiment of the development.

Now, in relation to FIG. 1, the architecture of a converged fixed access and mobile radio telecommunications network, the resources of which are managed by a management method according to an embodiment of the development is presented.

In the network in question, a node 150 of the converged fixed access and mobile radio network is connected, upstream, to the network core 140 strictly speaking and, downstream, to a plurality of modems of the network. The plurality of modems comprises: "fixed access" modems 100*mf*, at least one fixed piece of user equipment 100*cpe* being connected to the fixed access part of the network via a corresponding fixed access modem 100*mf*; and "mobile radio" modems 100*mma*, 100*mmb*, base stations 100*dua*, 100*dub* being connected to the mobile radio part of the network via a corresponding mobile radio modem 100*mma*, 100*mmb*.

More particularly, the plurality of modems 100*mf*, 100*mma*, 100*mmb* is connected to a router 100*r* of the node 150 via resources of the local loop, here optical fibres 100*fr*, 100*ff* transiting via a multiplexer 170. The fixed access modems 100*mf* are connected to the router 100*r* by corresponding optical fibres 100*ff* and the mobile radio modems 100*mma*, 100*mmb* are connected to the router 100*r* by corresponding optical fibres 100*fr* (e.g. according to an infrastructure of the FTTH (Fibre To The Home) type.

In other embodiments, there can be just a single fixed access modem 100*mf*.

In other embodiments, the local loop uses a technology other than optical fibres, and the modems 100*mf*, 100*mm* are connected to the router 100*r* via means other than the optical fibres 100*fr*, 100*ff* (e.g. via microwave transmission systems, pairs of conductors made of copper, etc.).

Returning to FIG. 1, the base stations 100*dua*, 100*dub* each belong to two different mobile operators. More particularly, the first mobile operator has the base station 100*dua* connected to the mobile radio part of the network via the mobile radio modem 100*mma* and the second mobile operator has the base station 100*dub* connected to the mobile radio part of the network via the mobile radio modem 100*mmb*.

In other embodiments, more than two mobile operators each have at least one base station connected to the mobile radio part of the network via a modem itself connected to the local loop of the network.

Returning to FIG. 1, the module 120 is a module for centralised management both: of the local loop resources dedicated to the operation both of the mobile radio part and of the fixed access part of the network; and of the other, "fixed access" resources dedicated more specifically to the operation of the fixed access part of the network.

In the present application, the module 120 is also called "local loop and fixed access resource management module". Moreover, it is noted in general that the term module can correspond both to a software component and to a hardware component or a set of software and hardware components, a software component itself corresponding to one or more computer programs or subprograms or more generally to any element of a program capable of implementing a function or a set of functions as described for the module(s) in question. Likewise, a hardware component corresponds to any element of a hardware assembly capable of implementing a function or a set of functions for the module(s) in question (integrated circuit, chip card, memory card, etc.). In this case, the hardware component is in the form of a device capable of or configured to implement a function or a set of functions as described for the module(s) in question.

More particularly, the module 120 manages in a centralised manner, inter alia, the local loop resources of the network on the basis on the one hand of at least one indicator of performance of the local loop of the network, called "local loop performance indicator". The local loop performance indicator(s) are transmitted in particular by the router 100*r* and/or all or a part of the modems 100*mma*, 100*mmb*, 100*mf* via the router 100*r*.

Moreover, the module 120 transmits to a module 160*bl* for centralised management dedicated to the allocation of the resources of the local loop of the network one (or more) pieces of information representing the availability of the local loop resources. Such a piece of information representing the availability of the local loop resources is for example obtained from the local loop performance indicator(s).

As described below in relation to FIG. 2, the module 160*bl* for centralised management dedicated to the allocation of the resources of the local loop of the network receives one (or more) requests for local loop resources emitted by a module 170*mob* for centralised management of the requests for resources of the network for mobile radio clients and/or by a module 170*fix* for centralised management of the requests for resources of the network for fixed clients. In response to such requests, the module 160*bl* sends one (or more) offers of resources of the local loop to the corresponding mobile clients and/or to the corresponding fixed clients.

The modules 110*a* and 110*b* for management of the mobile radio resources are dedicated respectively to the operation of the mobile radio part of the first and second aforementioned mobile operators. As an illustrative example, the modules 110*a* and 110*b* could each resemble the C-SON (Centralized-Self Organizing Networks) as defined in the 3GPP, but here with new functionalities allowing the management of the resources of the network. For example, the modules 110*a* and 110*b* each receive one (or more) performance indicators of the mobile radio part that they manage, transmitted by all or a part of the base stations 100*dua*, 100*dub* and/or by the modules 100*vrana* and 100*vranb* of virtualised radio functions moved in the network and dedicated to the mobile radio parts of the first and second mobile operators. For example, the modules 100*vrana* and 100*vranb* correspond to a centralised radio element CU in the sense of the 3GPP. In other embodiments, more than two mobile operators each have a base station connected to a mobile radio part of the network. In this case, each mobile operator has a module for management of the corresponding mobile radio resources to manage the operation of the mobile radio part that is dedicated thereto.

Returning to FIG. 1, the module 130 for management of the virtualised resources moved in the network manages in a centralised manner the virtualised resources 100*vm* (in terms of hardware resources, e.g. calculation capacity, storage capacity, random-access memory capacity, etc.) of the network on the basis of the module. To do this, the module 130 receives one (or more) performance indicators of the virtualised part of the network, called virtualised performance indicators, sent by the module(s) 100*vcpe* of virtualised functions moved in the network and/or by the virtualised resource module 100*vm*. More particularly, the module 100*vcpe* implements virtualised functions moved in the network and dedicated to a corresponding fixed piece of user equipment 100*cpe*. In the present application, the module 100*vcpe* is also called "module of virtualised fixed piece of equipment functions". The module 100*vcpem* is a module for management of the virtualised functions moved in the network as implemented in the module 100*vcpe*.

Moreover, the module 130 transmits to a module 160*v* for centralised management dedicated to the allocation of the virtualised resources of the network one (or more) pieces of information representing the availability of the virtualised resources. Such a piece of information representing the availability of the virtualised resources is for example obtained from one (or more) indicators of performance of the virtualised resources of the network sent by the module(s) 100*vcpe* of virtualised functions moved in the network and/or of resources 100*vm* (e.g. an indicator of availability and/or load of the virtualised resources, an indicator of performance of the functions (e.g. vCPE or vRAN) supported by these resources).

As described below in relation to FIG. 2, the module 160v for centralised management dedicated to the allocation of the virtualised resources of the network receives one (or more) requests for resources (virtualised or local loop) emitted by the module 170mob for centralised management of the requests for resources of the network for mobile radio clients and/or by the module 170fix for centralised management of the requests for resources of the network for fixed clients. In response to such requests, the module 160bl sends one (or more) offers of virtualised resources to the corresponding mobile clients and/or to the corresponding fixed clients.

The module 170mob for centralised management of the requests for resources of the network for mobile radio clients centralises the requests of the mobile clients, send by the modules 110a and 110b, in terms of mobile services. The module 170mob translates the needs associated with the mobile services in question into terms of needs for resources (virtualised and/or of the local loop). The module 170mob requests the needs for resources obtained from the modules 160bl and/or 160v.

Likewise, the module 170fix for centralised management of the requests for resources of the network for fixed clients centralises the requests of the fixed clients 100cpe in terms of fixed services. The module 170fix translates the needs associated with the fixed services in question into terms of needs for resources (virtualised and/or of the local loop). The module 170fix requests the needs for resources obtained from the modules 160bl and/or 160v.

Figure 2:
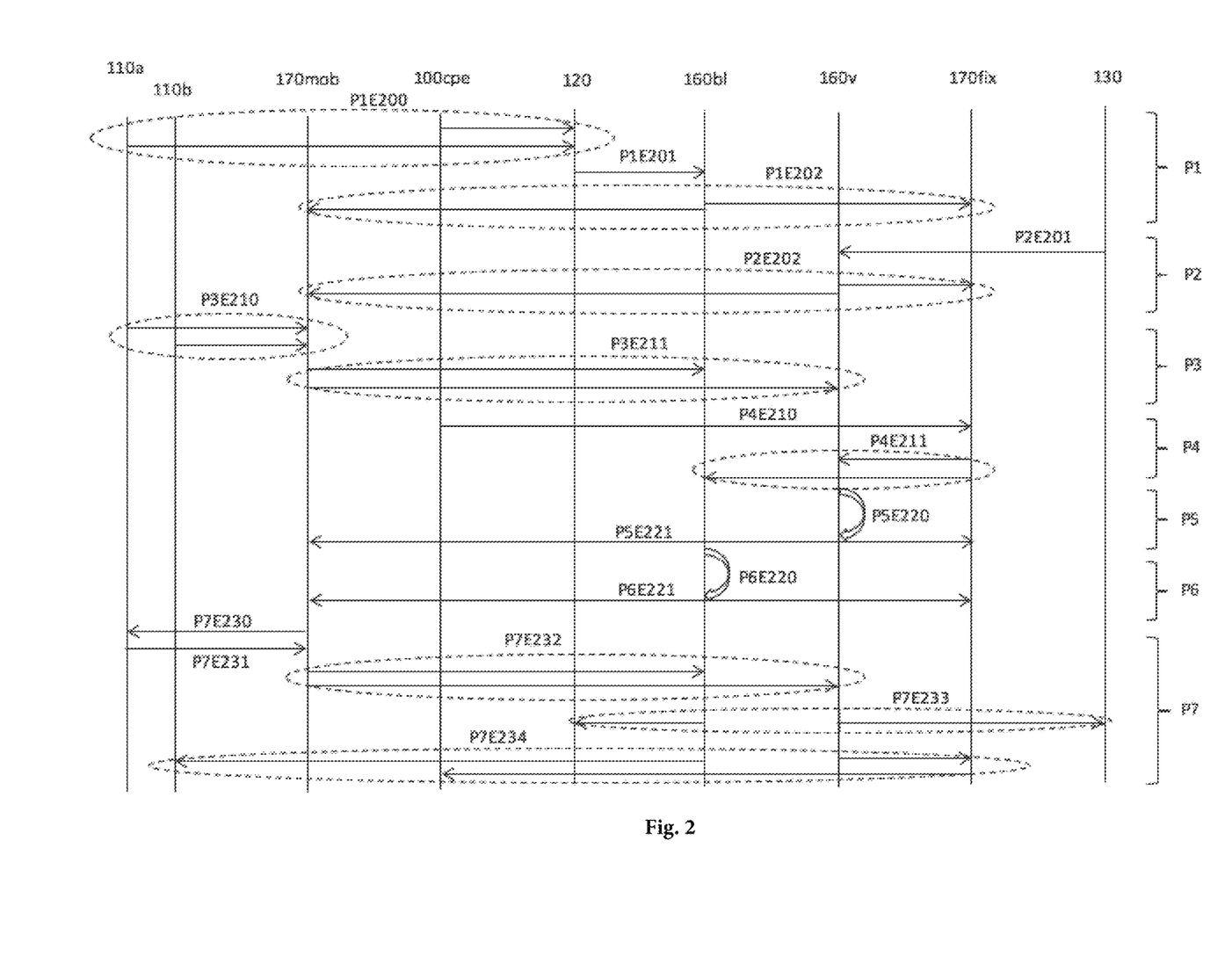
FIG. 2 shows the steps of a method for managing the resources of the network of FIG. 1 according to an embodiment of the development.

Now, in relation to FIG. 2, the steps of a method for managing the resources of the network of FIG. 1 according to an embodiment of the development are presented.

Phase P1:

During a step P1E200, the module 120 receives the local loop performance indicator(s) transmitted in particular by the router 100r and/or all or a part of the modems 100mma, 100mmb, 100mf via the router 100r.

During a step P1E201, the module 160bl receives from the module 120 one (or more) pieces of information representing the availability of the local loop resources. Such a piece of information representing the availability of the local loop resources is for example obtained by the module 120 from the local loop performance indicator(s) received in step P1E200 (e.g. the mobile clients must have a guaranteed bitrate).

During a step P1E202, the module 160bl transmits the piece(s) of information representing the availability of the local loop resources to the module 170fix and to the module 170mob. Thus, the module 170mob and the module 170fix are capable of forming a shared and updated database containing the information on the offers of resources of the local loop. Moreover, the fixed or mobile clients can access for reading the information contained in the database in question if necessary. Alternatively, the database can be distributed on all or a part of the fixed or mobile clients having available the resources necessary to do this. The information recorded in the database can also be certified by consensus by each client as a certified distributed register.

In other embodiments, the module 160bl transmits the piece(s) of information representing the availability of the local loop resources only to one of the modules 170fix and 170mob in order to limit the exchanges of data. In other embodiments, the module 160bl does not implement the step P1E202 in order to even further limit the exchanges of data.

Phase P2:

During a step P2E200 (not shown in FIG. 1), the module 130 receives the virtualised performance indicator(s), e.g. sent by the module(s) 100vcpe of virtualised functions moved in the network and/or virtualised resources 100vm.

During a step P2E201, the module 160v receives from the module 130 one (or more) pieces of information representing the availability of the virtualised resources. Such a piece of information representing the availability of the virtualised resources is for example obtained by the module 130 from the virtualised performance indicator(s) received in step P2E200 (e.g. the resources in question are of the type calculation capacity, memory storage capacity, random-access memory capacity, etc.).

During a step P2E202, the module 160v transmits the piece(s) of information representing the availability of the virtualised resources to the module 170fix and to the module 170mob. Thus, the module 170mob and the module 170fix are capable of forming a shared and updated database containing the information on the offers of virtualised resources. Moreover, the module 170mob and the module 170fix can transmit the information contained in the database in question to the fixed or mobile clients if necessary.

In other embodiments, the module 160v transmits the piece(s) of information representing the availability of the virtualised resources only to one of the modules 170fix and 170mob in order to limit the exchanges of data. In other embodiments, the module 160v does not implement the step P2E202 in order to even further limit the exchanges of data.

Phase P3:

During a step P3E210, the module 170mob for centralised management of the requests for resources of the network for mobile radio clients centralises the requests of the mobile clients, sent by the modules 110a and 110b, in terms of mobile services.

During a step P3E211, the module 170mob translates the needs associated with the mobile services in question into terms of needs for resources (virtualised and/or of the local loop) and sends one (or more) corresponding requests for resources to the module 160bl and/or 160v according to the nature of the resources requested (i.e. to the module 160bl for the local loop resources and module 160v for the virtualised resources). For example, for mobile clients, the request for resources sent by the module 170mob to the module 160bl relates to resources of the "guaranteed bitrate" type and the request to the module 160v relates to resources of the "dedicated" type (or "high resilience" in that they cannot be shared when they are not used). In certain embodiments, the module 170mob verifies before sending them that the request(s) in question correspond to resources effectively available by using the knowledge of the information representing the availability of the local loop and/or virtualised resources emitted by the modules 160bl and/or 160v during steps P1E202 and P2E202.

Phase P4:

During a step P4E210, the module 170fix for centralised management of the requests for resources of the network for fixed clients centralises the requests of the fixed clients 100cpe in terms of fixed services (e.g. for an augmented reality service).

During a step P4E211, the module 170fix translates the needs associated with the fixed services in question into terms of needs for resources (virtualised and/or of the local loop) and sends one (or more) corresponding requests for resources to the module 160bl and/or 160v according to the nature of the resources requested (i.e. to the module 160bl for the local loop resources and module 160v for the virtualised resources).

In certain embodiments, the module 170fix verifies before sending them that the request(s) in question correspond to resources effectively available by using the knowledge of the information representing the availability of the local loop and/or virtualised resources emitted by the modules 160*bl* and/or 160*v* during steps P1E202 and P2E202.

Phase P5:

During a step P5E220, the module 160*v* decides on the offer(s) of allocation of virtualised resources of the network to make to the various clients for which the module 160*v* received a request for resources during step P3E211 and/or during step P4E211.

More particularly, the module 160*v* decides on the offer(s) of allocation of virtualised resources according to the request(s) in question and at least one predetermined resource allocation offer rule. Since such predetermined rules used by the module 160*v* are (or can be) known by the mobile operators, the latter can have confidence in the resource allocation offers that are made to them.

For example, such a predetermined resource allocation offer rule belongs to the group comprising: a resource allocation offer is sent first in response to a request received first in a series of several requests; a resource allocation offer is sent first in response to a request received last in a series of several requests; a resource allocation offer is sent first in response to a request having a priority level of urgency of processing in a series of several received requests having various levels of urgency of processing; a resource allocation offer is made according to an auction mechanism (e.g. a simple auction mechanism (the highest price wins), a double auction mechanism (average of the bids), or an auction mechanism with or without a reserve price (the offer must be greater than the reserve price)); a resource allocation offer is made for a defined duration; and a resource allocation offer is only made if other resources are freed in exchange.

In certain embodiments, the offer(s) of allocation of virtualised resources are also dependent on the piece(s) of information representing the availability of the local loop resources and/or on the piece(s) of information representing the availability of the virtualised resources.

During a step P5E221, the module 160*v* sends the offer(s) of allocation of virtualised resources to the various clients via the module 170*mob* and/or the module 170*fix* according to the origin of the requests for resources received during step P3E211 and/or during step P4E211.

In alternatives, a virtualised resource proposed in a given allocation offer cannot be proposed via another offer to another client. It is placed back among the set of the available resources if the client to which the offer is addressed does not send a confirmation of acceptance of the allocation offer within a predetermined time.

Phase P6:

During a step P6E220, the module 160*bl* decides on the offer(s) of allocation of local loop resources of the network to make to the various clients for which the module 160*v* received a request for resources during step P3E211 and/or during step P4E211.

More particularly, the module 160*bl* decides on the offer(s) of allocation of local loop resources according to the request(s) in question and at least one predetermined resource allocation offer rule. For example, the module 160*bl* implements a rule of the type of those implemented by the module 160*v* during phase P5 and given as examples above.

In certain embodiments, the offer(s) of allocation of local loop resources are also dependent on the piece(s) of information representing the availability of the local loop resources and/or on the piece(s) of information representing the availability of the virtualised resources.

During a step P6E221, the module 160*bl* sends the offer(s) of allocation of virtualised resources to the various clients via the module 170*mob* and/or the module 170*fix* according to the origin of the requests for resources received during step P3E211 and/or during step P4E211.

Likewise in alternatives, a local loop resource proposed in a given allocation offer cannot be proposed via another offer to another client. It is placed back among the set of the available resources if the client to which the offer is addressed does not send a confirmation of acceptance of the allocation offer within a predetermined time.

Phase P7:

After phases P5 and P6, the module 170*mob* and/or the module 170*fix* have received the resource allocation offers from the modules 160*bl* and/or 160*v*. Thus, the module 170*mob* and/or the module 170*fix* then sends the offers in question to the mobile and/or fixed clients that were able to obtain a resource allocation offer.

In the example illustrated in FIG. 2, the module 110*a* of the first mobile operator obtained a resource allocation offer after its request for service made in step P3E210. On the contrary, the module 110*b* of the second mobile operator and the fixed client 100*cpe* did not obtain any resource allocation offer after their request made respectively in steps P3E210 and P4E210. Therefore: during a step P7E230, the module 170*mob* sends the resource allocation offer (virtualised and/or local loop according to the need expressed in the request for service sent during the aforementioned step P3E210) to the module 110*a*; during a step P7E231, the module 110*a* sends a confirmation of acceptance of the resource allocation offer, called confirmed allocation offer, to the module 170*mob*; during a step P7E232, the module 170*mob* sends the confirmed allocation offer to the module 160*bl* and/or to the module 160*v* according to the nature of the resources proposed (to the module 160*v* for the virtualised resources and/or to the module 160*bl* for the local loop resources); during a step P7E233, the module 160*bl* and/or the module 160*v* sends one (or more) confirmations of reservation of the resources to the module 120 and/or to the module 130 according to the nature of the resources proposed (to the module 130 for the virtualised resources and/or to the module 120 for the local loop resources). For example, the confirmation(s) of reservation of the resources are sent to the module 120 and/or to the module 130 when the confirmation(s) of acceptance of the resource allocation offer is received during the aforementioned step P7E232. In certain alternatives, the module 120 and/or the module 130 confirms reception of the confirmation(s) of reservation of the resources received.

During a step P7E234, the module 160*bl* and/or the module 160*v* sends a piece of information to the module 170*mob* and to the module 170*fix* respectively indicating that the module 110*b* and the fixed client 100*cpe* do not have a resource allocation offer made to them. The module 170*mb* and the module 170*fix* transmit the piece of information in question respectively to the module 110*b* and to the fixed client 100*cpe*.

Figure 3:
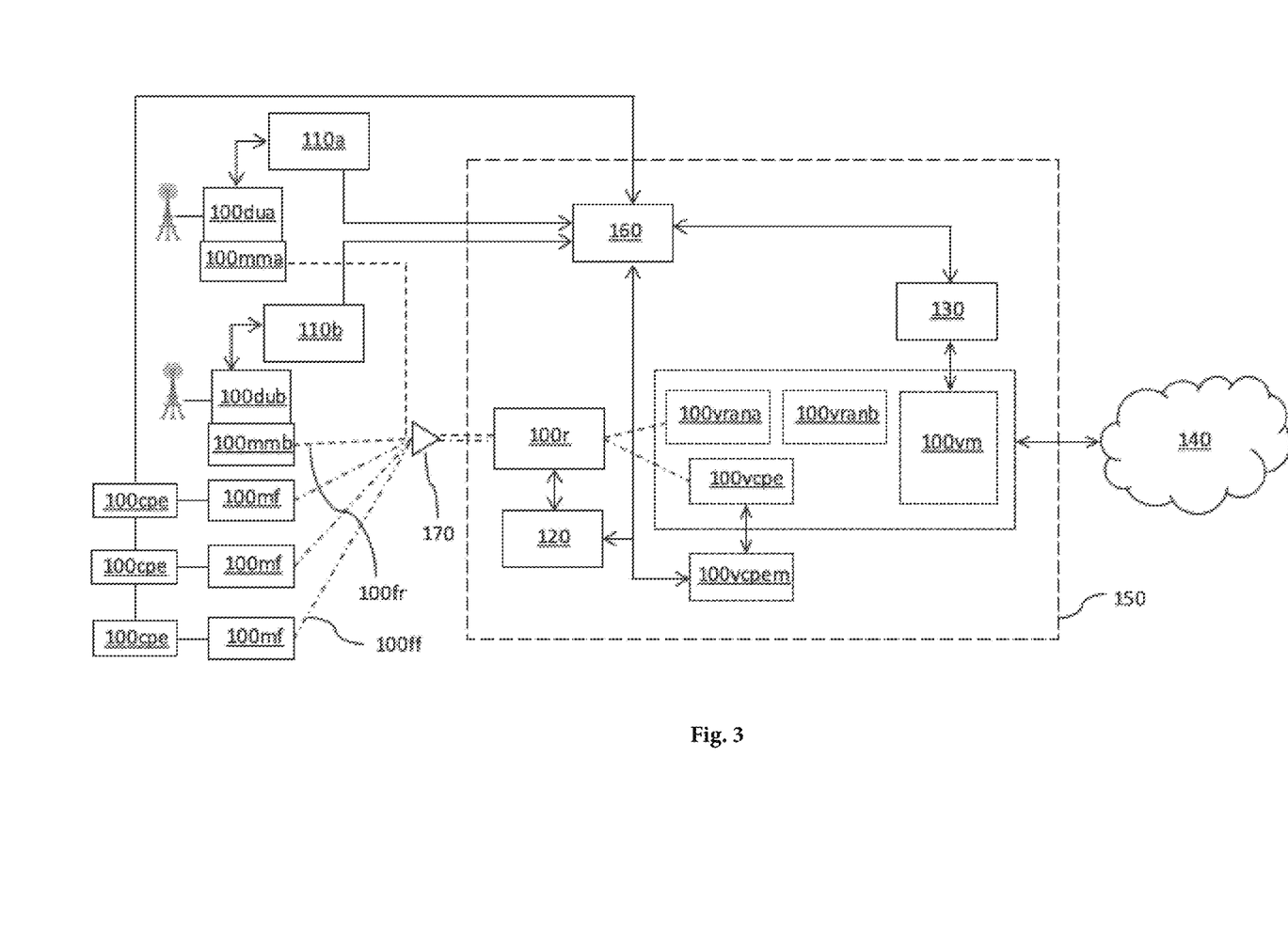
FIG. 3 shows the architecture of a converged fixed access and mobile radio telecommunications network, the resources of which are managed by a management method according to another embodiment of the development.

Now, in relation to FIG. 3, the architecture of a converged fixed access and mobile radio telecommunications network, the resources of which are managed by a management method according to another embodiment of the development is presented.

The same elements as in the embodiment illustrated in FIG. 1 are found again, except that the modules 170*fix* and 170*mob* are absent here. Moreover, the modules 160*v* and 160*bl* are combined into the same single module 160 which implements, by means of several adaptations, the functionalities of the two modules 160*v* and 160*bl* as described below in relation to FIG. 4.

Figure 4:
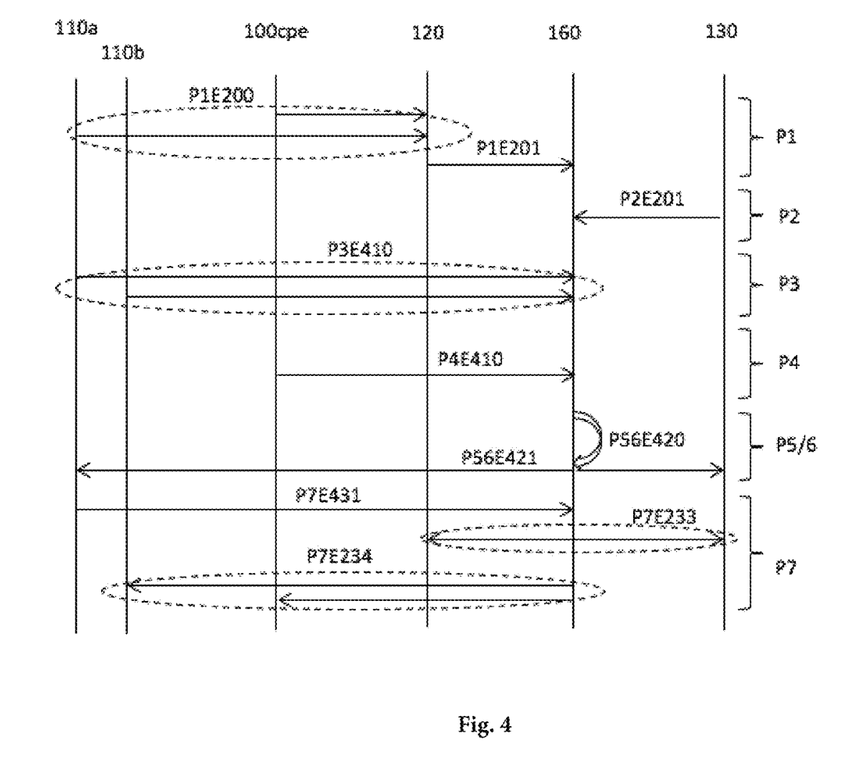
FIG. 4 shows the steps of the method for managing the resources of the network of FIG. 3 according to another embodiment of the development.

Now, in relation to FIG. 4, the steps of a method for managing the resources of the network of FIG. 3 according to another embodiment of the development are presented.

In this embodiment, the steps of phases P1 and P2 of the embodiment illustrated in FIG. 2 are found again, except that during step P1E201, the module 120 now sends the piece(s) of information representing the availability of the local loop resources to the module 160 and no longer to the module 160*bl*, the module 160 now implementing the functionalities of the two modules 160*v* and 160*bl*. Likewise during step P2E201, the module 130 sends the piece(s) of information representing the availability of the virtualised resources to the module 160 and no longer to the module 160*v*.

Moreover, steps P1E202 and P2E202 are no longer implemented here, since the modules 170*fix* and 170*mob* are no longer implemented.

In the embodiment of FIG. 4, during phase P3 the steps P3E210 and P3E211 of FIG. 2 are combined here into a single step P3E410 during which the mobile radio clients send, via the modules 110*a* and 110*b*, directly to the module 160 one (or more) requests for resources (virtualised resources and/or resources of the local loop).

Likewise, during phase P4, the steps P4E210 and P4E211 of FIG. 2 are combined here into a single step P4E410 during which the mobile clients send, via the modules 110*a* and 110*b*, directly to the module 160 one (or more) requests for resources (virtualised and/or of the local loop). The same applies for the fixed clients 100*cpe*.

Thus, according to this embodiment, the final client (mobile or fixed) expresses its need directly in terms of needs for resources that can be of different natures (e.g. virtualised and/or for resources in the local loop). Therefore, it is the final client in question that must ensure that it indeed receives as many resource allocation offers, potentially of different natures, as necessary in order to implement a given service. On the contrary, in the embodiment of FIG. 2, it is the modules 170*fix* and 170*mob* that ensure this consistency and not the final client.

Returning to FIG. 4, during phase P5/6 (corresponding to a combination of the phases P5 and P6 of FIG. 2), the steps P5E220 and P6E220 of FIG. 2 are combined here into a single step P56E420 during which the module 160 decides on the offer(s) of allocation of resources (virtualised and/or of the local loop) of the network to make to the various clients for which the module 160 received a request for resources during the step P3E410 and/or the step P4E410.

Moreover, the steps P5E221 and P6E221 of FIG. 2 are combined here into a single step P56E421 during which the module 160 sends the network resource allocation offer(s) (virtualised and/or of the local loop) to the corresponding clients, i.e. the modules 110*a* and/or 110*b* and/or fixed clients 100*cpe*, according to the origin of the requests for resources received during step P3E410.

Likewise, during phase P7, the steps P7E231 and P7E232 of FIG. 2 are combined here into a single step P7E431 during which the module 110*a* sends a confirmation of acceptance of the resource allocation offer, called confirmed allocation offer, to the module 160 and no longer to the module 170*mob*.

Likewise, during step P7E233, it is the module 160, and no longer the module 160*bl* and/or the module 160*v*, that sends one (or more) confirmations of reservation of the resources to the module 120 and/or to the module 130 according to the nature of the resources proposed (virtualised and/or local loop). Indeed, the module 160 now implements the functionalities of the two modules 160*v* and 160*bl*.

The same applies during step P7E234 during which it is the module 160, and no longer the module 160*bl* and/or the module 160*v*, that sends a piece of information directly to the module 110*b* and to the fixed client 100*cpe* respectively indicating that they do not have a resource allocation offer made to them.

In other embodiments, the modules 170*fix* and 170*mob* are not implemented, like in the embodiment of FIGS. 3 and 4; however, the modules 160*v* and 160*bl* are still implemented in a distinct manner and not in the form of a single module 160.

In these embodiments, the module 160*v* manages the offers of allocation of the virtualised resources of the network and the module 160*bl* manages the offers of allocation of the local loop resources of the network with the functionalities described above in relation to FIGS. 1 and 2.

In other embodiments, the modules 160*v* and 160*bl* are combined into the same single module 160 like in the embodiment of FIGS. 3 and 4; however, the modules 170*fix* and 170*mob* are still implemented (in the form of a single module or two distinct modules) with the functionalities described above in relation to FIGS. 1 and 2.

In other embodiments, a single module simultaneously implements the functionalities of the modules 170*fix*, 170*mob*, 160*v* and 160*bl*. In these embodiments, the mobile clients 110*a* and 110*b* send to the single module in question one (or more) requests for mobile services. The same applies to the fixed clients 100*cpe* that send to the single module one (or more) requests for fixed services. It is thus the single module that translates the needs associated with the services in question into terms of needs for resources (virtualised and/or of the local loop) by thus implementing the functionalities of the modules 170*fix* and 170*mob* described above in relation to FIGS. 1 and 2.

Figure 5:
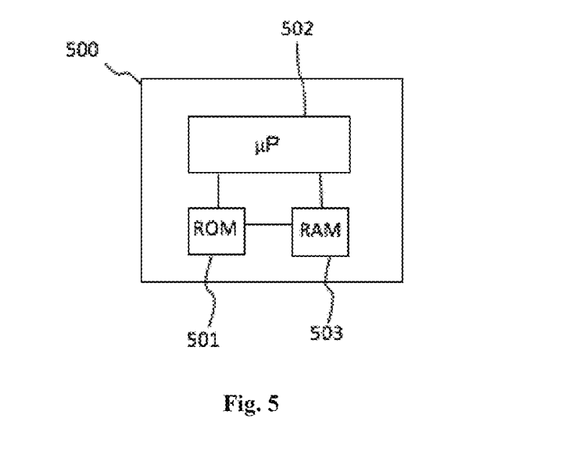
FIG. 5 shows an example of a structure of a device allowing the implementation of the steps of the method for managing the resources according to an embodiment of the development.

Now, in relation to FIG. 5, an example of a structure of a device 500 allowing to implement the steps of the method for managing the resources of FIGS. 2 and 3 according to an embodiment of the development is presented.

The device 500 comprises a random-access memory 503 (for example a RAM memory), a processing unit 502 equipped for example with a processor, and controlled by a computer program stored in a read-only memory 501 (for example a ROM memory or a hard disk). Upon initialisation, the code instructions of the computer program are for example loaded into the random-access memory 503 before being executed by the processor of the processing unit 502. This FIG. 3 only illustrates a particular manner, among several possible, of carrying out the device 500 in order for it to carry out certain steps of the management method according to the development (according to any one of the embodiments and/or alternatives described above in relation to FIG. 2). Indeed, these steps can be carried out indifferently on a reprogrammable calculation machine (a PC computer, a DSP processor or a microcontroller) executing a program comprising a sequence of instructions, or on a dedicated calculation machine (for example a set of logic gates such as an FPGA or an ASIC, or any other hardware module).

In the case in which the device 500 is carried out with a reprogrammable calculation machine, the corresponding program (that is to say the sequence of instructions) can be stored in a storage medium that is removable (for example such as a diskette, a CD-ROM or a DVD-ROM) or not, this storage medium being partly or totally readable by a computer or a processor.

In certain embodiments, the device 500 implements any one of the modules 170*fix*, 170*mob*, 160*v* and 160*bl*.

In certain embodiments, the device 500 implements several or the totality of the modules 170*fix*, 170*mob*, 160*v* and 160*bl*.

In certain embodiments, the device 500 is included in a network node, e.g. in the node 150.

The invention claimed is:

1. A method of managing resources of a converged fixed access and mobile radio telecommunications network, a part of the resources, comprising virtualized resources, being implemented in a virtualized form and moved in the network, another part of the resources, comprising local loop resources, being implemented in a local loop of the network, a plurality of mobile operators each having at least one base station connected to a mobile radio part of the network via a mobile radio modem connected to the local loop,
 wherein a module for centralized management of the allocation of the resources carries out:
  receiving at least one request for resources, comprising mobile client request, emitted either by a module for management of the mobile radio resources of each of the mobile operators, or by a first module for centralized management of the requests for resources from at least one request for mobile radio service previously received from the mobile radio resource management module of each of the mobile operators;
  sending at least one offer of allocation of the resources to the modules for management of the mobile radio resources according to the at least one mobile client request and at least one predetermined resource allocation offer rule; and
  a reception of at least one confirmation of acceptance of the offer of allocation of the resources, comprising confirmed allocation offer, sent by:
   at least one module out of the modules for management of the mobile radio resources of each of the mobile operators; or
   at least one piece of user equipment;
 wherein the module for centralized management of the allocation of the resources carries out a reception:
  of at least one piece of information representing an availability of the local loop resources transmitted by a module for management of the local loop and fixed access resources of the network; and
  of at least one piece of information representing an availability of the virtualized resources transmitted by a module for management of the virtualized resources moved in the network, the at least one allocation offer being dependent on the at least one piece of information representing the availability of the local loop resources and on the at least one piece of information representing the availability of the virtualized resources, and
 wherein the module for centralized management of the allocation of the resources sends at least one confirmation of reservation of the resources to the network local loop and fixed access resource management module and to the module for management of the virtualized resources moved in the network, the at least one confirmation of reservation of the resources being sent when the at least one confirmation of acceptance of the offer of allocation of the resources is received.

2. The method according to claim 1, wherein at least one piece of user equipment of a fixed operator is connected to a fixed access part of the network via at least one fixed access modem connected to the local loop,
 and wherein the module for centralized management of the allocation of the resources carries out a reception of at least one request for resources emitted either by the at least one piece of user equipment of the fixed operator, or by a second module for centralized management of the requests for resources from at least one request for fixed service previously received from the at least one piece of user equipment, comprising fixed client request,
 and wherein the at least one allocation offer is also sent to the at least one piece of user equipment, the at least one allocation offer being dependent on the at least one fixed client request.

3. The method according to claim 1, wherein the module for centralized management of the allocation of the resources carries out a reception:
 of at least one piece of information representing the availability of the local loop resources transmitted by a module for management of the local loop and fixed access resources of the network; and
 of at least one piece of information representing the availability of the virtualized resources transmitted by a module for management of the virtualized resources moved in the network, the at least one allocation offer being dependent on the at least one piece of information representing the availability of the local loop resources and on the at least one piece of information representing the availability of the virtualized resources.

4. The method according to claim 3, wherein the module for centralized management of the allocation of the resources carries out a transmission of the at least one piece of information representing the availability of the local loop resources and of the at least one piece of information representing the availability of the virtualized resources to the first and/or a second centralized resource request management module.

5. The method according to claim 1, wherein the at least one predetermined resource allocation offer rule belongs to a group comprising:
 an offer of allocation of the resources is sent first in response to a request received first in a series of several requests;
 an offer of allocation of the resources is sent first in response to a request received last in a series of several requests;
 an offer of allocation of the resources is sent first in response to a request having a priority level of urgency of processing in a series of several received requests having various levels of urgency of processing;
 an offer of allocation of the resources is made according to an auction mechanism;
 an offer of allocation of the resources is made for a defined duration; and
 an offer of allocation of the resources is only made if other resources are freed in exchange.

6. A non-transitory computer storage medium, storing instructions of a computer program, causing implementation of the method according to claim 1, when the program is executed on a computer.

7. A method of managing resources of a converged fixed access and mobile radio telecommunications network, a part of the resources being implemented in a virtualized form and moved in the network, another part of the resources being implemented in a local loop of the network, a plurality of mobile operators each having at least one base station connected to a mobile radio part of the network via a mobile radio modem connected to the local loop, wherein a first module for centralized management of the requests for resources for mobile clients carries out:

receiving at least one request for mobile radio service emitted by a module for management of the mobile radio resources of each of the mobile operators;

transmitting to a module for centralized management of an allocation of the resources of the network at least one request for resources taking into account the at least one request for mobile radio service; and a reception of at least one confirmation of acceptance of an offer of allocation of the resources, comprising confirmed allocation offer, sent by:

at least one module out of the modules for management of the mobile radio resources of each of the mobile operators; or at least one piece of user equipment;

wherein the module for centralized management of the allocation of the resources carries out a reception:

of at least one piece of information representing an availability of the local loop resources transmitted by a module for management of the local loop and fixed access resources of the network; and of at least one piece of information representing an availability of the virtualized resources transmitted by a module for management of the virtualized resources moved in the network, the at least one allocation offer being dependent on the at least one piece of information representing the availability of the local loop resources and on the at least one piece of information representing the availability of the virtualized resources, and wherein the module for centralized management of the allocation of the resources sends at least one confirmation of reservation of the resources to the network local loop and fixed access resource management module and to the module for management of the virtualized resources moved in the network, the at least one confirmation of reservation of the resources being sent when the at least one confirmation of acceptance of the offer of allocation of the resources is received.

8. A non-transitory computer storage medium, storing instructions of a computer program, causing implementation of the method according to claim 7, when the program is executed on a computer.

9. A device for centralized management of allocation of resources of a converged fixed access and mobile radio telecommunications network, a part of the resources, comprising virtualized resources, being implemented in a virtualized form and moved in the network, another part of the resources, comprising local loop resources, being implemented in a local loop of the network, a plurality of mobile operators each having at least one base station connected to a mobile radio part of the network via a mobile radio modem connected to the local loop, wherein the device comprises a reprogrammable calculation machine or a dedicated calculation machine, configured to:

receive at least one request for resources, comprising mobile client request, emitted either by a module for management of the mobile radio resources of each of the mobile operators, or by a first module for centralized management of the requests for resources from at least one request for mobile radio service previously received from the mobile radio resource management module of each of the mobile operators;

send at least one offer of allocation of the resources to the modules for management of the mobile radio resources according to the at least one mobile client request and at least one predetermined resource allocation offer rule; and receive at least one confirmation of acceptance of the offer of allocation of the resources, comprising confirmed allocation offer, sent by:

at least one module out of the modules for management of the mobile radio resources of each of the mobile operators; or at least one piece of user equipment;

wherein the device is configured to receive:

of at least one piece of information representing an availability of the local loop resources transmitted by a module for management of the local loop and fixed access resources of the network; and of at least one piece of information representing an availability of the virtualized resources transmitted by a module for management of the virtualized resources moved in the network, the at least one allocation offer being dependent on the at least one piece of information representing the availability of the local loop resources and on the at least one piece of information representing the availability of the virtualized resources, and wherein the device sends at least one confirmation of reservation of the resources to the network local loop and fixed access resource management module and to the module for management of the virtualized resources moved in the network, the at least one confirmation of reservation of the resources being sent when the at least one confirmation of acceptance of the offer of allocation of the resources is received.

10. A node of a converged fixed access and mobile radio telecommunications network, wherein the node comprises at least one device according to claim 9.

11. A device for centralized management of requests for resources of a converged fixed access and mobile radio telecommunications network, a part of the resources, comprising virtualized resources, being implemented in a virtualized form and moved in the network, another part of the resources, comprising local loop resources, being implemented in a local loop of the network, a plurality of mobile operators each having at least one base station connected to a mobile radio part of the network via a mobile radio modem connected to the local loop, wherein the device comprises a reprogrammable calculation machine or a dedicated calculation machine, configured to:

receive at least one request for mobile radio service emitted by a module for management of the mobile radio resources of each of the mobile operators;

transmit to a module for centralized management of the allocation of the resources of the network at least one request for resources taking into account the at least one request for mobile radio service; and receive at least one confirmation of acceptance of the offer of allocation of the resources, comprising confirmed allocation offer, sent by:
- at least one module out of the modules for management of the mobile radio resources of each of the mobile operators; or
- at least one piece of user equipment;

wherein the device is configured to receive:
- of at least one piece of information representing an availability of the local loop resources transmitted by a module for management of the local loop and fixed access resources of the network; and
- of at least one piece of information representing an availability of the virtualized resources transmitted by a module for management of the virtualized resources moved in the network, the at least one allocation offer being dependent on the at least one piece of information representing the availability of the local loop resources and on the at least one piece of information representing the availability of the virtualized resources, and wherein the device sends at least one confirmation of reservation of the resources to the network local loop and fixed access resource management module and to the module for management of the virtualized resources moved in the network, the at least one confirmation of reservation of the resources being sent when the at least one confirmation of acceptance of the offer of allocation of the resources is received.

12. A node of a converged fixed access and mobile radio telecommunications network, wherein the node comprises at least one device according to claim 11.

* * * * *